United States Patent
Kaste et al.

(10) Patent No.: US 10,524,340 B2
(45) Date of Patent: Dec. 31, 2019

(54) FASTENER SYSTEM FOR IGNITION PREVENTION TRIGGERED BY A LIGHTNING STRIKE, STRUCTURE COMPRISING THE FASTENER SYSTEM, AND METHOD FOR MANUFACTURING THE STRUCTURE

(71) Applicant: Airbus Operations GmbH, Hamburg (DE)

(72) Inventors: Michael Kaste, Hamburg (DE); Lutz Weber, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 391 days.

(21) Appl. No.: 15/486,104

(22) Filed: Apr. 12, 2017

(65) Prior Publication Data
US 2017/0303376 A1    Oct. 19, 2017

(30) Foreign Application Priority Data
Apr. 13, 2016  (EP) ..................... 16165084

(51) Int. Cl.
   *H05F 3/02*    (2006.01)
   *B64F 5/10*    (2017.01)
   *B64D 45/02*   (2006.01)
   *F16B 33/00*   (2006.01)

(52) U.S. Cl.
   CPC ............ *H05F 3/02* (2013.01); *B64D 45/02* (2013.01); *B64F 5/10* (2017.01); *F16B 33/004* (2013.01)

(58) Field of Classification Search
   CPC ........ H05F 3/02; F16B 33/006; F16B 33/004; F16B 5/04; F16B 5/0642; B64F 5/10; B64D 45/02

USPC ..................................................... 361/216
   See application file for complete search history.

(56) References Cited

U.S. PATENT DOCUMENTS

| 3,494,243 A | 2/1970 | Kleinhenn |
| 4,681,497 A | 7/1987 | Berecz |
| 2009/0173828 A1* | 7/2009 | Oguri ............... B29C 65/562 244/132 |

FOREIGN PATENT DOCUMENTS

| DE | 102010040338 | 3/2012 |
| EP | 2703659 | 3/2014 |
| GB | 2212580 | 7/1989 |
| WO | 8900649 | 1/1989 |

OTHER PUBLICATIONS

EP 2703659; Fischer; Date: Mar. 5, 2014; Par. 0017-0018; Figure 4; col. 8 lines 10-11 (Year: 2014).*
European Search Report, dated Aug. 9, 2016 for Appl. No. 16165084. 1-1754.

* cited by examiner

*Primary Examiner* — Dharti H Patel
(74) *Attorney, Agent, or Firm* — Greer, Burns & Crain Ltd.

(57) ABSTRACT

A fastener system for ignition prevention triggered by a lightning strike. The fastener has a fastener body and a fastener head, and a fastening member configured to be mounted on a portion of the fastener body, wherein the fastener and the fastening member are configured to fasten at least a first part and a second part between the fastener head and the fastening member, and the fastener comprises an electrically insulating material. A structure comprises the fastener system, the first part that faces an outside from where the lightning strike may hit the first part and the second part.

21 Claims, 2 Drawing Sheets

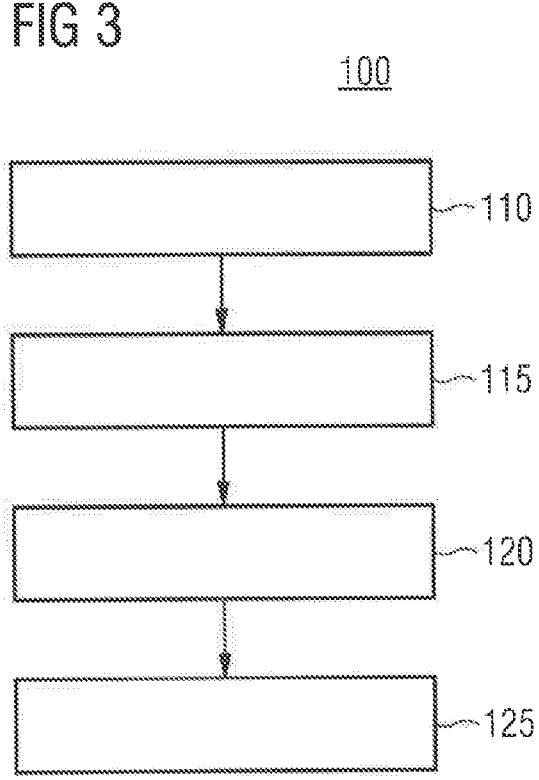

FASTENER SYSTEM FOR IGNITION PREVENTION TRIGGERED BY A LIGHTNING STRIKE, STRUCTURE COMPRISING THE FASTENER SYSTEM, AND METHOD FOR MANUFACTURING THE STRUCTURE

CROSS REFERENCE TO RELATED APPLICATIONS

This application claims priority to European Patent Application No. 16165084.1 filed on Apr. 13, 2016, the entirety of which is incorporated herein by reference.

FIELD OF THE INVENTION

The invention relates to a fastener system for ignition prevention triggered by a lightning strike, a structure comprising the fastener system, and a method for manufacturing the structure.

Containments for storing ignitable substances that are deployed or located outside are subject to lightning strikes. For example, fuel tanks, gas tanks and tanks in refineries may be hit by lightning strikes. The same problem is present for containments for storing ignitable substances that are located in movable objects, e.g., automobiles, motorcycles, trains and aircrafts. Taking the example of aircrafts, most aircrafts comprise containments for storing ignitable substances, for example, fuel tanks containing fuel. Such containments may be located within the airframe of the aircraft, e.g., in a wing of the aircraft.

An airframe of an aircraft includes, inter alia, surface elements, e.g., surface panels, and structural elements, e.g., rods, bars, and wall elements of a containment. In known aircraft designs, surface elements of the aircraft are fixed to structural elements inside the aircraft with fastening elements. For this, the fastening elements, e.g., screws or bolts made of metal, fasten the surface element and the structural element together with the fastening elements inserted from outside of the aircraft into throughholes formed in the surface element and the structural element, wherein the tip of the fastening element is fixed inside the aircraft with a fixing part made of metal.

If a lightning strike hits the aircraft and a high current flows through the wing-surface panel or a component member of a main wing of the aircraft, part or the entirety of the current may flow from the outside of the aircraft through one or more of the fastening elements made of metal to the inside of the aircraft. If the current exceeds a limit value of a passage allowable current of a fastening element, an electric discharge (called an "electric arc" or a "thermal spark") may occur, which may lead to ignition of ignitable substances, e.g., fuel, stored in a containment within the aircraft, and/or damage of the inboard electronics.

To avoid such electric arcs, known fastening element designs for aircrafts employ additional safety measures. For example, a known lightning protection fastener design uses an electrically conductive fastening element made of metal and an electrical isolation area around the fastening element. Other known lightning protection fastener designs provide an electrical low conductive path within the structure.

However, in such known lightning protection fastener designs, the fastening element is part of the lightning strike current path. Thus, the known lightning protection fastener designs have the disadvantage of a complex design, which leads to increased manufacturing and maintenance costs. Moreover, such a complex design increases the weight of the fixing structure.

The present invention is directed at providing a cost and weight optimized fastener system for ignition prevention triggered by a lightning strike and a structure comprising such a fastener system, which reliably protect when being hit by a lightning strike. Moreover, the invention is directed to a method for manufacturing such a structure, which does not increase the manufacturing costs, however, reliably protects when being hit by a lightning strike.

SUMMARY OF THE INVENTION

This may be achieved by a fastener system for ignition prevention triggered by a lightning strike having the features of one or more embodiments described herein, by a structure having the features of one or more embodiments described herein, and by a method for manufacturing a structure having the features of one or more embodiments described herein.

A fastener system for ignition prevention triggered by a lightning strike comprises a fastener having a fastener body and a fastener head, and a fastening member configured to be mounted on a portion of the fastener body. The fastener and the fastening member are configured to fasten at least a first part and second part between the fastener head and the fastening member, and the fastener comprises of an electrically insulating material.

Since the fastener comprises of an electrically insulating material, the fastener is not part of the electrical current path in case a lightning strike hits the first part. Thus, electric arcing, thermal sparking and outgassing due to a current flow can be prevented. Moreover, since the fastener comprises of a non-conductive material, the insulation against lightning current has a long-term stability. Additionally, since the fastener comprises of an electrically insulating material instead of an electrically conductive material, known joining techniques for fastening the at least first and second parts may be used during manufacturing. Thus, the present technique has a low impact on design, production and maintenance.

The fastener system for ignition prevention triggered by a lightning strike may be used in any object that is located outside and may be hit by a lightning strike. In particular, the fastener system may be used for any containment for storing ignitable substances that are deployed or located outside and may be subject to lightning strikes. For example, the fastener system may be used for fuel tanks, gas tanks and tanks in refineries. The fastener system may also be used in movable objects, like automobiles, motorcycles, trains and aircrafts, which comprise containments for storing ignitable substances.

The fastener may be provided as a one piece element including the fastener body and the fastener head, e.g., a pin-shaped fastener body with a fastener head. In particular, the fastener may be realized as a rivet, a bolt or a screw made of an electrically insulating material. Preferably, the fastener body has a round cross sectional shape. However, the fastener body may principally have any cross sectional shape that allows it to be protruded through the at least two parts. The fastening member may, for example, be a nut or a collar that may be mounted on a portion of the fastener body opposite the fastener head. It is also possible that the fastener head is mounted in a similar manner as the fastening member on a portion of the fastener body opposite the fastening member.

The fastener system may also be provided as a one piece element. For example, when realizing the fastener system as a rivet, specifically a solid rivet, the factory head of the rivet may correspond to the fastener head and the deformed end of the rivet, i.e., the shop head or buck-tail, may correspond to the fastening member.

The at least first and second parts may be any two parts, for example, a surface part and a part of a containment wall. Each of the at least first and second parts may comprise a hole through which the fastener body can be stuck. Alternatively, the fastener body may also be screwed or penetrated through the at least first and second parts. It is further possible that the fastener and the fastener member fasten more than two parts between the fastener head and the fastening member, i.e., at least one further part is provided between the first and second parts.

As to electrically insulating materials of the fastener, the fastener may comprise of at least one of glass, ceramics and a composite polymer material. In case of ceramics, the fastener preferably comprises porcelain comprising at least one of clay, quartz and feldspar. In case the fastener comprises a composite polymer material, it may comprise a central rod made of fiber reinforced plastic and an outer shed made of silicone rubber or ethylene propylene diene monomer rubber. Further preferably, the fastener may be a polyamide-imide (PAI). With such materials, it can be prevented that the lightning protection fastener acts as an electrical current path in case a lightning strike hits the first part.

In order to provide a tight sealing between the at least two parts and the fastener system, a sealing material can be provided on at least a portion of the fastener body other than the portion of the fastener body where the fastener member is mounted on the fastener body. For example, the sealing material may be provided on a circumferential surface of the fastener body where the fastener connects the first part and the second part. Moreover, the sealing material may be provided at the inner surfaces of holes provided at the first and second parts and through which the fastener body is stuck, i.e., between the inner surfaces of the holes and the circumferential surface of the fastener body of the fastener.

In a preferred embodiment, the fastener head is configured to protrude from a surface of the first part that is facing the outside from where a lightning strike may hit the first part. In this case, the sealing material may only be provided on a circumferential surface of the fastener body between the fastener head and the portion of the fastener body where the fastening member is mounted on the fastener body. For example, the fastener may be realized as a rivet, a bolt or a screw, wherein the fastener head protrudes from the outer surface of the first part so that the surface of the fastener head that faces the fastening member is provided on the surface of the first part that is facing the outside. Thereby, a simple fastening structure is provided, which ensures low manufacturing costs and optimized weight.

In another preferred embodiment, the fastener head has a decreasing diameter in a direction towards the fastener body. In this case, the fastener head may be configured to be at least partly sunk in a surface of the first part that is facing the outside from where a lightning strike may hit the first part, and the sealing material is only provided on a circumferential surface of the fastener head that is facing the fastening member and a circumferential surface of the fastener body between the fastener head and the portion of the fastener body where the fastening member is mounted on the fastener body. For example, the fastener may have a counter sunk fastener head, wherein the surface of the fastener head that faces the outside provides a plane surface with the surface of the first part that is facing the outside. In this case, the sealant material may only be provided at the outer circumferential surface of the fastener head and a portion of the outer circumferential surface of the fastener body that is provided in the holes. Thereby, a simple fastening structure is provided, which, however, ensures low manufacturing costs and optimized weight.

Preferably, the sealing material is a moisture-curing sealing material. Thereby, tightness of the structure with an easy to handle installation may be achieved. In particular, by providing a wet sealant material on at least part of the circumferential surface of the fastener, thereafter providing the fastener through the holes provided in the at least first and second parts, and then moisture-curing the sealing material, a tight sealing structure can be provided. The moisture-curing may be realized by air-drying. Thus, assembly of the structure may be facilitated, in particular, if the fastener system is employed in areas which are not easily accessible for sealing.

To further facilitate construction of the fastener system, no sealing material may be provided at the portion of the fastener body where the fastener member is mounted on the fastener body. Thereby, additional weight may be saved.

In addition to the sealing properties of the sealing material, the sealing material may have insulating properties so that no electron exchange is possible. Thus, galvanic corrosion can be avoided.

Preferably, a force-fit or a form-fit mounting of the fastening member on the portion of the fastening body is provided. For example, the fastening body may comprise a thread and the fastening member may be a nut, wherein the nut is screwed on the tip end of the fastener body in order to fix the at least first and second parts between the fastener head and the fastening member. Alternatively, it is possible that the fastening member is realized as a collar that is clipped to a tip end of the fastener body. Other known mounting techniques, like gluing, may also be used.

In a further preferred embodiment, the fastening member comprises of an electrically insulating material. For example, the fastening member may be the same material as the fastener. Thereby, the lightning strike protection capability of the fastener assembly may be further improved.

A structure comprises a fastener system, a first part that faces an outside from where a lightning strike may hit the first part, and a second part.

The structure may be a composite structure, a metal structure or a hybrid structure. Moreover, the structure may be used in any object that is located outside and may be hit by a lightning strike. In particular, the structure may be used for any containment for storing ignitable substances that is deployed or located outside and may be subject to lightning strikes. For example, the structure may be used for fuel tanks, gas tanks and tanks in refineries. The structure may also be used in movable objects, like automobiles, motorcycles, trains and aircrafts, which comprise containments for storing ignitable substances.

In a preferred embodiment, each of the first part and the second part comprises a hole through which the fastener body is provided.

Preferably, at least one of the first part and the second part of the structure comprises of an electrically insulating material.

To protect stored ignitable substances from ignition, the second part may be a part of a containment for ignitable substances.

A method for manufacturing a structure comprises the steps of providing a fastener body of a fastener system through the first and second parts, and providing the fastening member at a portion of the fastener body to fix the first and second parts between the fastening member and the fastener head.

For example, in case the fastener is realized as a screw and the fastening member is realized as a nut, the fastening member may be mounted at a portion of the fastener body. In case the fastener system is realized a rivet, the end of the rivet opposite the factory head may be deformed to provide the fastening member at a portion of the fastener body.

To facilitate the manufacturing of the structure, the method may comprise the further step of providing a moisture-curing sealing material on the fastener body or in holes provided in the first and second parts before the step of providing the fastener body through the first and second parts.

Moreover, the method may comprise a step of air-drying the moisture-curing sealing material in order to provide a tight sealing between the fastener and the first and second parts. Preferably, this step may be provided at the end of the manufacturing method.

BRIEF DESCRIPTION OF THE DRAWINGS

Preferred embodiments of the invention will now be explained in more detail with reference to the appended schematic drawings, wherein

FIG. 3 shows a flowchart of a method for manufacturing a composite structure of an aircraft.

DETAILED DESCRIPTION OF EMBODIMENTS OF THE INVENTION

Figure 1:
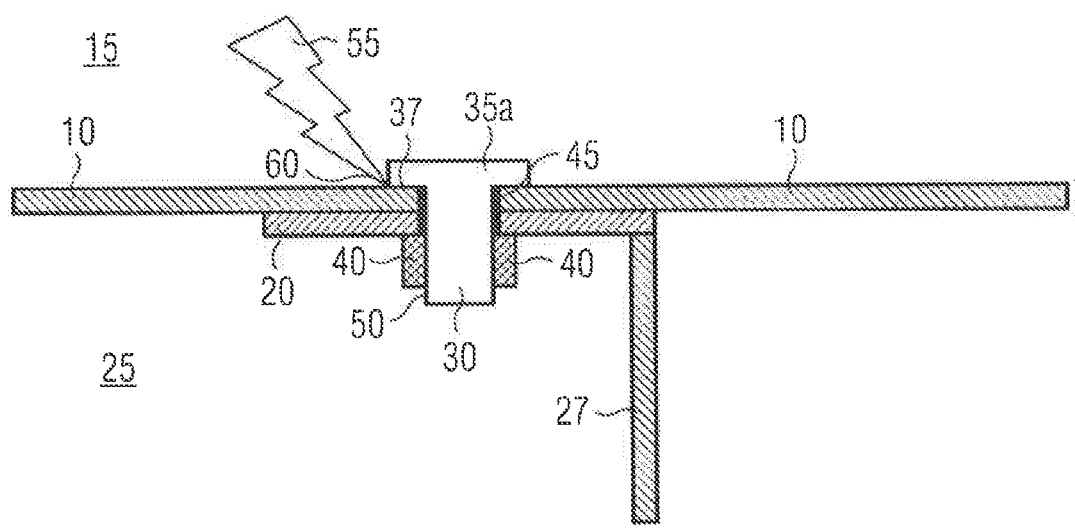
FIG. 1 shows a first embodiment of a fastener system and a composite structure.
Figure 2:
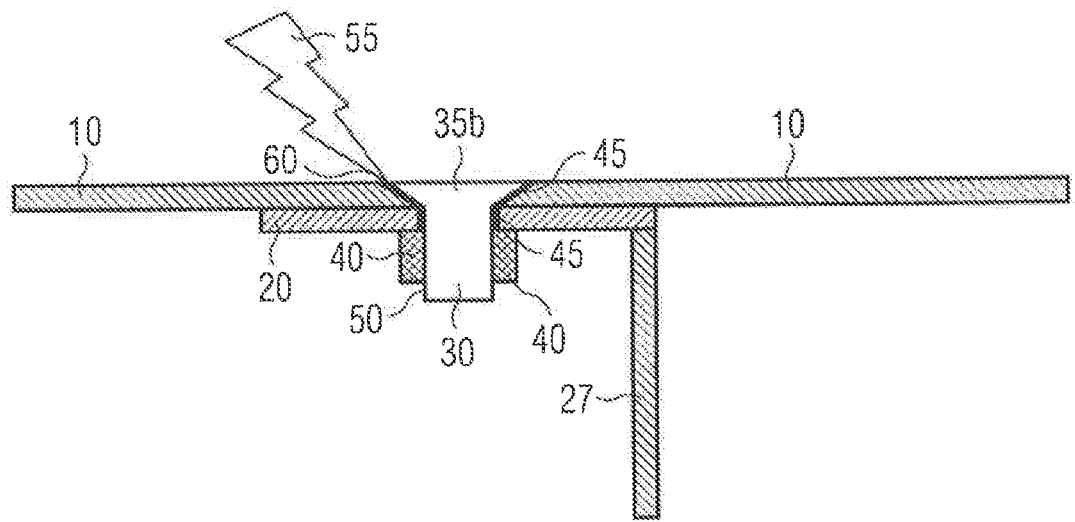
FIG. 2 shows a second embodiment of a fastener system and a composite structure.

Although the embodiments according to FIGS. 1 to 3 explain the invention in more detail based on the examples of an aircraft and a composite structure, the present invention is not limited thereto, and the invention may also be realized in any other object that is deployed or located outside and may be hit by a lightning strike, and any other structure.

FIG. 1 shows a schematic drawing of a first embodiment of a fastener system and a composite structure for an aircraft comprising the fastener system.

In more detail, FIG. 1 depicts a first part 10 of an aircraft that faces the outside 15 of the aircraft, and a second part 20 of the aircraft that faces the inside 25 of the aircraft. For example, the first part 10 may be a surface panel of the aircraft and the second part 20 may be a part (e.g., a wall) of a containment for storing fuel. It also possible that at least one further part or layer is provided between the first and second parts 10, 20. Moreover, in FIG. 1, the first and second parts 10, 20 are shown as straight elements, however, the first and second parts 10, 20 may also have any other shape, e.g., be curved. In the schematic drawing of FIG. 1, a sidewall 27 of the containment is further exemplarily shown. Within the containment, an ignitable substance, e.g., fuel, is stored (not shown in FIG. 1). Parts 10, 20 and 27 may be electrically conductive or electrically insulating materials.

Within the first part 10 and the second part 20, throughholes are provided. In particular, the throughholes match each other and provide one common opening from the outside 15 to the inside 25 of the aircraft.

For fixing the first part 10 and the second part 20 together, a fastener system is foreseen. The fastener system comprises of a fastener comprising a fastener body 30 and a fastener head 35a, and a fastening member 40.

The fastener body 30 and the fastener head 35a are made as a one piece element. The fastener body 30 is stuck through the holes provided in the first and second parts 10, 20 from the outside 15 of the aircraft towards the inside 25 of the aircraft until the fastener head 35a abuts the outer surface of the first part 10. As shown in FIG. 1, the fastener head 35a protrudes from the outer surface of the part 10. The fastener head 35a may have any shape with an abutment surface 37 facing the fastening member 40 that enables a stable contact with the outer surface of the part 10. Preferably, the abutment surface 37 of the fastener head 35a has the same shape as the outer surface of the first part 10.

Before sticking the fastener body 30 through the holes, a sealant material 45 is provided on at least a part of the circumferential surface 50 of the fastener body 30 or in the holes of the parts 10, 20.

Thereafter, the fastening member 40 is mounted from the inside 25 on the fastener body 30 so that the first and second parts 10, 20 are fixed between the fastener head 35a and the fastening member 40. As can be seen from FIG. 1, when the fastening member 40 is mounted on the on the fastener body 30, a part of the fastener body 30 may protrude from the fastening member 40 towards the inside 25 of the aircraft. In particular, the fastening member 40 is mounted in such a manner on the fastener body 30 that fastener head 35a and the fastening member 40 provide a stable fixing of the first and second parts 10, 20 therebetween. The fastening member 40 may, e.g., be realized as a nut or a collar and may provide a force-fit or form-fit connection with the fastener body 30, i.e., the outer circumferential surface 50 of the fastener body 30.

The fastener body 30 and the fastener head 35a are made of an electrically insulating material. Preferably, the fastener body 30 and the fastener head 35a may comprise or may consist of at least one of glass and ceramics. Specifically, the fastener body 30 and the fastener head 35a may comprise or may consist of porcelain comprising at least one of clay, quartz and feldspar. The fastener body 30 and the fastener head 35a may also comprise or may consist of a composite polymer material. In this case, the fastener body 30 and the fastener head 35a comprises a central rod made of fiber reinforced plastic and an outer shed made of silicone rubber or ethylene propylene diene monomer rubber (not shown in FIG. 1).

When a lightning strike 55 hits the aircraft at the first part 10, an arc attachment point 60 of the lightning strike 45 may be located on the outer surface of the first part 10 at an outer end of the fastener head 35a. Due to the electrically insulating properties of the fastener body 30 and the fastener head 35a, these elements cannot act as a current path through the fastener system. Thus, an ignition of the ignitable substance provided within the containment 20, 27 can be prevented.

The fastening member 30 and/or the sealant material 45 may also be made of an electrically insulating material in order to further improve the lightning protection capabilities.

As can be seen from FIG. 1, the sealant material 45 is only provided in the holes between the abutment surface 37 of the fastener head 35a and the upper surface of the fastening member 40, i.e., between the outer circumferential surface 50 of the fastener body 30 and the inner surface of the holes of the parts 10 and 20. Thus, a tight sealing of the fastener body 30 between the parts 10 and 20 is ensured. Moreover, due to the electrically insulating property of the sealant material 45, the sealant material 45 may as well not act as a current path for the lightning strike 55.

Accordingly, the composite structure of the aircraft comprises of the fastener head 35a, the fastener body 30, the fastening member 40, and the first and second parts 10, 20. Additionally, the sealant material 45 may be provided in the holes.

FIG. 2 shows a schematic drawing of a second embodiment of a fastener system and a composite structure for an aircraft comprising the fastener system.

The second embodiment corresponds to the first embodiment. Differences between the first embodiment and the second embodiment are that the fastener of the second embodiment comprises a counter sunk head 35b instead of the fastener head 35a and that the hole provided in the first part 10 of the first embodiment differs from the hole provided in the first part 10 of the second embodiment. Moreover, contrary to the first embodiment, in the second embodiment, the sealant material 45 is additionally provided at the outer circumferential surface of the fastener head 35b, i.e., between the inner surface of the holes provided in the part 10 and the outer circumferential surface of the fastener head 35b. All other elements are the same so that these elements will not again be described for the second embodiment. In particular, the fastener head 35b of the second embodiment may comprise the same material as the fastener head 35a of the first embodiment.

In the second embodiment according to FIG. 2, the fastener head 35b is sunk into the first part 10 so that the outer surface of the first part 10 and the outer surface of the fastener head 35b provide a plane surface. It is also possible that the fastener head 35b is more deeply sunk into the first part 10, or even at least partly sunk into the second part 20. Due to the increasing diameter of the fastener head 35b in the direction opposite to the fastener body 30, when providing the fastener body 30 in the holes, the fastener head 35b may forcibly increase the diameter of the hole provided in the first part 10.

Similar to the first embodiment, in case a lightning strike 55 hits the aircraft at the first part 10, an arc attachment point 60 of the lightning strike 45 may be located on the outer surface of the first part 10 at an outer end of the fastener head 35b. Due to the electrically insulating properties of the fastener body 30 and the fastener head 35b, these elements cannot act as a current path through the fastener system. Similar, the sealant material 45 having electrically insulating properties does not act as a current path. Thus, an ignition of the ignitable substance provided within the containment 20, 27 can be prevented.

FIG. 3 shows a flowchart of a method 100 for manufacturing a composite structure of an aircraft. The method 100 may be employed for manufacturing the composite structure according to each of FIGS. 1 and 2. However, the method 100 may also be employed for manufacturing other composite or non-composite structures.

The method 100 comprises the steps of providing 115 the fastener body 30 through the first and second parts 10, 20 of the aircraft, and mounting 120 the fastening member 40 on a portion of the fastener body 30 to fix the first and second parts 10, 20 between the fastening member 40 and the fastener head 35a, 35b.

Additionally, the method 100 may comprise the initial step 110 of providing a moisture-curing sealing material 45 on the fastener body 30 or in holes provided in the first and second parts 10, 20 before the step 115 of providing the fastener body through the first and second parts 10, 20.

Finally, the method 100 may comprise the step 125 of air-drying the moisture-curing sealing material 45. To save further manufacturing costs, the air-drying may be provided without using any drying machinery.

Thus, a simple method for manufacturing a composite structure of an aircraft, which reliably protects the aircraft when being hit by a lightning strike, is provided.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A fastener system for ignition prevention triggered by a lightning strike, the fastener system comprising:
   a fastener having a fastener body and a fastener head;
   a fastening member configured to be mounted on a portion of the fastener body,
   wherein the fastener and the fastening member are configured to fasten at least a first part and a second part between the fastener head and the fastening member, and
   wherein the fastener comprises an electrically insulating material; and,
   a sealing material provided on at least a portion of the fastener body other than the portion of the fastener body where the fastening member is mounted on the fastener body.

2. The fastener system according to claim 1, wherein the fastener comprises of at least one of glass, ceramics and a composite polymer material.

3. The fastener system according to claim 1, wherein the fastener comprises porcelain comprising at least one of clay, quartz and feldspar.

4. The fastener system according to claim 1, wherein the fastener comprises a composite polymer material and comprises a central rod made of fiber reinforced plastic and an outer shed made of silicone rubber or ethylene propylene diene monomer rubber.

5. The fastener system according to claim 1, wherein the fastener head is configured to protrude from a surface of the first part that is facing an outside from where a lightning strike may hit the first part, and the sealing material is only provided on a circumferential surface of the fastener body between the fastener head and the portion of the fastener body where the fastening member is mounted on the fastener body.

6. The fastener system according to claim 1, wherein the fastener head has a decreasing diameter in a direction towards the fastener body and is configured to be at least partly sunk in a surface of the first part that is facing an outside from where a lightning strike may hit the first part, and the sealing material is only provided on a circumferential surface of the fastener head that is facing the fastening member and a circumferential surface of the fastener body between the fastener head and the portion of the fastener body where the fastening member is mounted on the fastener body.

7. The fastener system according to claim 1, wherein the sealing material is a moisture-curing sealing material.

8. The fastener system according to claim 1, wherein at least one of the sealing material and the fastening member comprises an electrically insulating material.

9. The fastener system according to claim 1, wherein a force-fit or a form-fit mounting of the fastening member on the portion of the fastener body is provided.

10. The fastener system according to claim 1, wherein the fastening member comprises an electrically insulating material.

11. A structure comprising:
the fastener system according to claim 1,
the first part that faces an outside from where a lightning strike may hit the first part, and
the second part.

12. The structure according to claim 11, wherein at least one of the first part and the second part comprises an electrically insulating material, or wherein the second part is a part of a containment for ignitable substances, or both.

13. A method for manufacturing the structure according to claim 11, the method comprising
providing the fastener body through the first and second parts; and
providing the fastening member at a portion of the fastener body to fix the first and second parts between the fastening member and the fastener head.

14. The structure according to claim 11, wherein the second part is a part of a containment for ignitable substances.

15. The structure according to claim 14, wherein at least one of the first part and the second part comprises an electrically insulating material.

16. A fastener system for ignition prevention triggered by a lightning strike, the fastener system comprising:
a fastener having a fastener body and a fastener head;
a fastening member configured to be mounted on a portion of the fastener body,
wherein the fastener and the fastening member are configured to fasten at least a first part and a second part between the fastener head and the fastening member,
wherein the fastener comprises an electrically insulating material, and,
wherein the fastener comprises porcelain comprising at least one of clay, quartz and feldspar.

17. A structure comprising:
the fastener system according to claim 16,
the first part that faces an outside from where a lightning strike may hit the first part, and
the second part.

18. A method for manufacturing the structure according to claim 17, the method comprising:
providing the fastener body through the first and second parts; and
providing the fastening member at a portion of the fastener body to fix the first and second parts between the fastening member and the fastener head.

19. A fastener system for ignition prevention triggered by a lightning strike, the fastener system comprising:
a fastener having a fastener body and a fastener head;
a fastening member configured to be mounted on a portion of the fastener body,
wherein the fastener and the fastening member are configured to fasten at least a first part and a second part between the fastener head and the fastening member,
wherein the fastener comprises an electrically insulating material, and,
wherein the fastener comprises a composite polymer material and comprises a central rod made of fiber reinforced plastic and an outer shed made of silicone rubber or ethylene propylene diene monomer rubber.

20. A structure comprising:
the fastener system according to claim 19,
the first part that faces an outside from where a lightning strike may hit the first part, and
the second part.

21. A method for manufacturing the structure according to claim 20, the method comprising:
providing the fastener body through the first and second parts; and
providing the fastening member at a portion of the fastener body to fix the first and second parts between the fastening member and the fastener head.

* * * * *